(12) United States Patent
Yun et al.

(10) Patent No.: US 7,869,662 B2
(45) Date of Patent: Jan. 11, 2011

(54) SYSTEM ARCHITECTURE FOR SENSING AN ABSOLUTE POSITION USING A TARGET PATTERN

(75) Inventors: Janet Yun, Santa Clara, CA (US); David C. Chu, Palo Alto, CA (US); Matthew D. Tenuta, Livermore, CA (US); Raymond Yeung, San Jose, CA (US); Nhan T. Nguyen, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 846 days.

(21) Appl. No.: 11/778,813

(22) Filed: Jul. 17, 2007

(65) Prior Publication Data

US 2008/0291470 A1    Nov. 27, 2008

Related U.S. Application Data

(63) Continuation-in-part of application No. 11/753,508, filed on May 24, 2007, now Pat. No. 7,489,409, which is a continuation of application No. 11/112,623, filed on Apr. 22, 2005, now Pat. No. 7,230,727.

(51) Int. Cl.
    *G06K 9/36*      (2006.01)
(52) U.S. Cl. .................. 382/291; 382/282; 382/307
(58) Field of Classification Search ................ 382/288, 382/291, 307
See application file for complete search history.

(56) References Cited

U.S. PATENT DOCUMENTS

| | | | | |
|---|---|---|---|---|
| 7,275,474 | B2 * | 10/2007 | Larkin et al. | 92/5 R |
| 7,304,745 | B2 * | 12/2007 | Towers et al. | 356/489 |
| 7,321,112 | B2 * | 1/2008 | Stam et al. | 250/216 |
| 7,409,092 | B2 * | 8/2008 | Srinivasa | 382/199 |
| 7,418,152 | B2 * | 8/2008 | Kawahara | 382/266 |

* cited by examiner

*Primary Examiner*—Yosef Kassa

(57) ABSTRACT

A location system and a location system on a chip (LCoS) and method are described.

24 Claims, 3 Drawing Sheets

300

301

SYSTEM ARCHITECTURE FOR SENSING AN ABSOLUTE POSITION USING A TARGET PATTERN

CROSS REFERENCE TO RELATED APPLICATIONS

The present application is a continuation-in-part (CIP) application under 37 C.F.R. §1.53(b) and claims the benefit of priority under 35 U.S.C. §120 to U.S. patent application Ser. No. 11/753,508 entitled "SYSTEM FOR SENSING AN ABSOLUTE POSITION IN TWO DIMENSIONS USING A TARGET PATTERN" and filed May 24, 2007 now U.S. Pat No. 7,489,409, which is a continuation of application Ser. No. 11/112,623 filed Apr. 22, 2005 now U.S. Pat. No. 7,230,727. Both the application and the referenced patent are assigned to the present assignee, Agilent Technologies, Inc. The disclosures of the referenced patent application and patent are specifically incorporated herein by reference.

BACKGROUND

In numerous applications, there is a need to measure precisely the location or position of an object. For example, many manufacturing processes require precise positioning of a moving stage or object. Several techniques for determining the position of a moving object have been developed. Some of these techniques are discussed below.

One method of determining the position of the moving stage involves optical encoding. In certain known optical encoding architectures, light from a light source is incident on a target pattern on the object. An optical sensor captures an image of the target pattern and from this image, the position of the object is determined.

Unfortunately, known optical encoders are comparatively large, which limits their implementation in certain settings. Moreover, thermal expansion in these comparatively large optical encoders can cause greater measurement error than the dimension being measured. Additionally, in many measurement environments it is useful to prevent contamination of the optical encoder due to ambient elements (e.g., dust and dirt) by enclosing the encoder in a suitable housing. As will be appreciated, the addition of the housing further increases the size of the encoder.

In addition to size-related drawbacks, many known two-dimensional optical encoders are limited by comparatively slow computational speeds. For example, in certain optical encoders the location of the object in each dimension must determined sequentially. As will be appreciated, this reduces the processing speed of measurement data. In many settings, comparatively slow processing speeds are a hindrance.

There is a need, therefore, for a system architecture for an optical encoder that overcomes at least the shortcoming of known optical encoders discussed above.

SUMMARY

In a representative embodiment, a location system includes an image sensor adapted to capture an image of a subset of a target pattern. The location system also includes a programmable logic device (PLD) operative to generate a first image vector representing summations of rows of pixel values from the image, and a second image vector representing summations of columns of pixel values from the image. The PLD is configured to determine from the image vectors an absolute position of the subset in at least two dimensions with respect to an origin of the target pattern.

In another representative embodiment, a location system on a chip (LSOC) includes an image sensor adapted to capture an image of a subset of a target pattern. The LSOC also includes a programmable logic device (PLD) operative to generate a first image vector representing summations of rows of pixel values from the image, and a second image vector representing summations of columns of pixel values from the image. The PLD is configured to determine an absolute position of the subset with respect to an origin of the target pattern in at least two dimensions.

In yet another representative embodiment, a method of determining a location includes illuminating a target having a two dimensional target pattern and capturing an image of a subset of the target pattern. The method also includes, in a field programmable gate array (FPGA): generating a first image vector representing summations of rows of pixel values from the image and a second image vector representing summations of columns of pixel values from the image; and determining an absolute position of the subset with respect to an origin of the target pattern in at least two dimensions.

BRIEF DESCRIPTION OF THE DRAWINGS

The present teachings are best understood from the following detailed description when read with the accompanying drawing figures. The features are not necessarily drawn to scale. Wherever practical, like reference numerals refer to like features.

DETAILED DESCRIPTION

In the following detailed description, for purposes of explanation and not limitation, representative embodiments disclosing specific details are set forth in order to provide a thorough understanding of the present teachings. Descriptions of well-known devices, hardware, software, firmware, methods and systems may be omitted so as to avoid obscuring the description of the example embodiments. Nonetheless, such hardware, software, firmware, devices, methods and systems that are within the purview of one of ordinary skill in the art may be used in accordance with the representative embodiments.

The detailed description which follows presents methods that may be embodied by routines and symbolic representations of operations of data bits within a computer readable medium, associated processors/controllers, and programmable logic devices (PLDs). A method is here, and generally, conceived to be a sequence of steps or actions leading to a desired result, and as such, encompasses such terms of art as "algorithm," "routine," "program," "objects," "functions," "subroutines," and "procedures."

With respect to the software useful in the embodiments described herein, those of ordinary skill in the art will recognize that there exist a variety of platforms and languages for creating software for performing the computational processes described. Certain illustrative embodiments can be implemented using any of a number of varieties of known machine languages useful in the various components of the location system and LSoC. However, those of ordinary skill in the art also recognize that the choice of the exact platform and language is often dictated by the specifics of the actual system constructed, such that what may work for one type of system may not be efficient on another type of system. In addition, in certain embodiments commercial software adapted for use with modules (interchangeably referred to herein as softcores or just 'cores') of the PLD and other components of the location system may be implemented to realize certain beneficial aspects. Some commercial software is noted for illustrative purposes.

Figure 1:
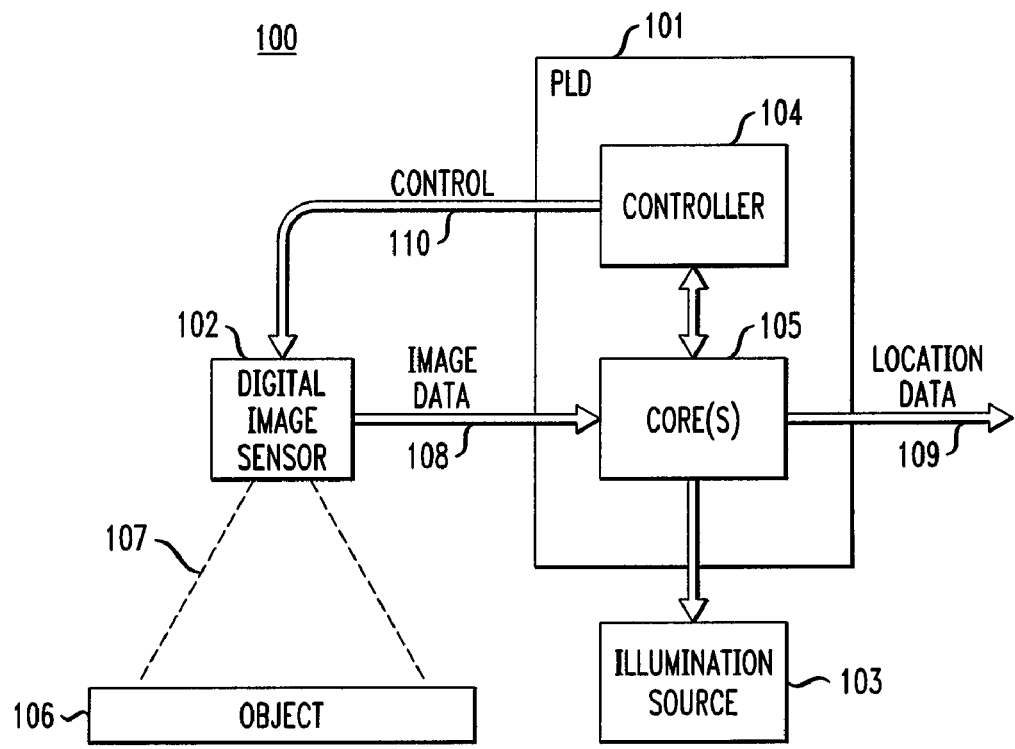
FIG. 1 is a simplified schematic diagram of a location system in accordance with a representative embodiment.

FIG. 1 is a simplified schematic diagram of a location system 100 in accordance with a representative embodiment. The system includes a PLD 101, a digital image sensor 102 and an illumination source 103. The PLD 101 illustratively includes a controller 104, and one or more cores 105 (or modules) instantiated in software as described more fully herein. The system 100 provides a location of a target pattern on an object 106. It is emphasized that the object 106 and the target pattern thereon are normally not considered a part of the system 100 of the representative embodiment.

In operation, the illumination source 103 provides light to the target pattern of the object 106 in an intermittent manner. For instance, the source 103 may comprise one or more light emitting diodes (LEDs) or lasers that illuminate in an intermittent manner (e.g., strobe). The digital image sensor 102 captures images 107 of the target pattern at each interval of the illumination of the target pattern. Image data 108 are provided from the sensor 102 to respective cores 105 of the PLD 101. The cores 105 comprise software adapted to carry out the method of the parent application and of referenced U.S. Pat. No. 7,230,727 to determine absolute location (position) data 109 of the object 106. The location data 109 are then provided to a user (not shown) for further use.

In a representative embodiment and by one or more methods described in the parent application and referenced patent, after receiving the image data 108, the PLD 101 is adapted to generate a first image vector representing summations of rows of pixel values from the image 107; and to generate a second image vector representing summations of columns of pixel values from the image 107. After the image vectors are calculated, the PLD 101 is configured to determine from the image vectors an absolute position of the subset in two dimensions with respect to an origin of the target pattern. It is emphasized that the determination of absolute position in more than two dimensions is contemplated by the present teachings.

In addition to determining the absolute position, and among other functions, the PLD 101 provides a control function for target pattern illumination and image capture. For example, the PLD 101 may receive a signal from the image sensor 102 indicating its status for receiving images. When the sensor 102 signals its status as being in a receive state, the PLD 101 provides control signals to the illumination source 103 to intermittently illuminate (strobe) the target pattern so an image may be captured. Alternatively, the PLD 101 can provide control signals to strobe the source 103 and provide control signals to the image sensor 102 to synchronize the strobing of the light with the capturing of images by the sensor 102.

In illustrative embodiments, the PLD 101 is a field programmable gate array (FPGA) and the controller 104 is instantiated in software therein. Alternatively, the controller 104 may be a separate component from the FPGA. Regardless, some of the cores 105 are adapted to determine location data of the target pattern and to provide an absolute position of the target pattern. In one embodiment, each core 105 is adapted to determine the position in a respective one of the dimensions of measure. For example, if it is useful to determine the position of the object in a three dimensional Cartesian coordinate system (i.e., x, y, z), three cores 105 would be required, with one core for each dimension of measure. Variations of the noted configuration of the FPGA are contemplated by the present teachings. For instance, instead of, or in addition to calculating the location of the object 106, the cores 105 may be adapted to calculate the rotation, or the pitch, or the tilt, or the yaw of the object 106, or a combination thereof. More generally, the PLD 101 may be configured to build on the methods or algorithms of the parent application and referenced patent to effect a variety of position calculations. Because of the comparatively accessible configuration of the PLD, a wide variety of dimensional calculations may be realized through modifications of the software of the cores 105, or additional cores, or both. Moreover, and as alluded to previously, the cores 105 of the FPGA may be adapted to perform the calculations of the position data in each dimension simultaneously. As will be appreciated, this allows for improved computational speed of the system 100 compared to many known systems.

In a specific embodiment, the PLD 101 is a commercially available Xilinx® Spartan III FPGA and the cores 105 are instantiated in Xilinx® ISE software to synthesize the FPGA. As noted, the software of the cores 105 is adapted to perform the method of the parent application and referenced patent. The programming of the cores to execute the method is within the purview of one of ordinary skill in the art, and is not detailed here to avoid obscuring the description of the representative embodiments.

In other representative embodiments, the PLD 101 may comprise an application specific integrated circuit (ASIC) adapted to perform the functions of the controller 104 and the cores 105. Alternatively, more than one PLD may be implemented in the system. For example, in an embodiment described more fully in connection with FIG. 4, the system is provided in two parts, with one part including the digital image sensor 102, the illumination source 103 and a PLD; and the other part including another PLD and controller. The PLDs of the referenced alternative embodiments may be one or more of a variety of PLDs known to one of ordinary skill in the art.

In a representative embodiment, the digital image sensor 102 is an active pixel sensor (APS), which consists of an integrated circuit including array of pixel sensors, each containing a photodetector and connecting to an active transistor reset and readout circuit. Beneficially, the sensor 102 has characteristics of comparatively high speed and high sensitivity. In one embodiment, the sensor 102 includes windowing, allowing for the selective use of a certain matrix of pixels. In another embodiment, the sensor 102 is a custom integrated circuit with a select number of pixels needed to properly capture the image of the target pattern.

As noted previously, the controller 104 may be integrated into the PLD 101 or may be a separate component of the system 100. Regardless of the implementation, the controller 104 provides a control function to the sensor 102 by sending control data 110 to the sensor 102. These data 110 may be configuration data such as gain, number of pixels to be viewed and the bit order of the data provided by the image sensor to the PLD 101. In addition, the controller 104 provides control data to and receives certain data from cores 105 of the FPGA. Illustratively, during the calculation of the location data 109, the cores 105 may calculate certain parametric data and provide such data to the controller 104. The controller 104 may be adapted to perform diagnostic analysis of these data and take a remedial measure in real time. For example, the parameters from the cores 105 may indicate that the sensor 102 is misaligned or improperly rotated. Alternatively or additionally, the parametric data received from the cores 105 may indicate that the illumination level is too low, or to high; or that the sensor 102 is improperly focused. Using these data, the controller 104 is adapted to determine to the required adjustments and to send control commands to make the necessary adjustments of alignment, or illumination, or focus as needed. Alternatively, or additionally, the diagnostic data may be provided to the user for appropriate action.

In addition, the controller 104 may be adapted to receive input from a user. The controller 104 then provides the input to the PLD 101 for execution. For example, in an embodiment in which the controller 104 is implemented in the PLD 101, the user may set input parameters to the controller 104, which provides the parameters to the cores 105.

Certain useful parameter settings are described presently in conjunction with representative embodiments. It is emphasized that these are intended only to illustrate the functionality of the system 100, and are in no way intended to limit the scope of the present teachings. In a representative embodiment, the setting of input parameters includes providing new code to a memory (not shown) of the system 100. This memory may be a flash memory or other suitable memory. This new code may provide a new vector sequence, or program a new sensor location or output resolution. As to the latter, the environment of the application of the system 100 often dictates the resolution requirements. The system 100 allows the resolution to be set for the particular application. For example, in some applications the resolution may be set to on the order of 1.0 μm, whereas in other applications, the resolution may be set to on the order of 100.0 nm. Notably, setting the resolution as low as approximately 0.1 nm is contemplated.

In another representative embodiment, the setting of the input parameters includes providing new code to the PLD 101 to set the sensor window, and thereby the location of image gathering by the sensor 102 from the object 106.

In yet other embodiments, setting of input parameters include: setting of the origin of the test pattern to be used in the calculation of the location vectors and location data; types and threshold levels of errors to be reported; and instructions of when to enter a diagnostic mode, to name only a few. As will be appreciated, the input of user parameters into the system 101 is comparatively straightforward by virtue of the ease with which PLDs (particularly FPGAs) of the representative embodiments can be configured.

Figure 2:
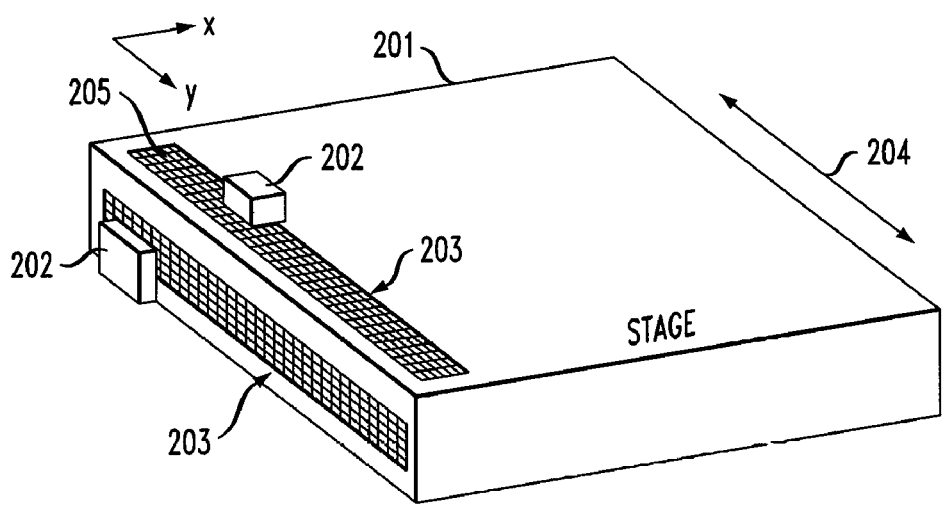
FIG. 2 is a conceptual view of an object passing by location systems in accordance with a representative embodiment.

FIG. 2 is a conceptual view of an object 201 (also referred to as a stage) passing by location systems 202 in accordance with a representative embodiment. The location systems 202 are as previously described in connection with FIG. 1 or as latterly described in connection with FIGS. 3A-4 herein. The object 201 includes a target pattern 203 disposed on a surface (s) of the object. In practice, normally only one location system 202 and one target pattern 203 are provided on one of the surfaces. The present conceptual view merely illustrates two possible implementations of the location system 202.

The object 201 illustratively moves along direction 204, which is in the y-direction in the representative embodiment. As described more fully in the parent application and referenced patent, images of the target pattern 203 are captured by the sensor 102 and data from the sensor 102 is provided to the PLD 101, which is adapted to calculate image vectors. From the image vectors, the PLD 101 determines an absolute position of a subset of the target pattern 203 in at least two dimensions with respect to an origin 205 of the target pattern.

Figure 3A:
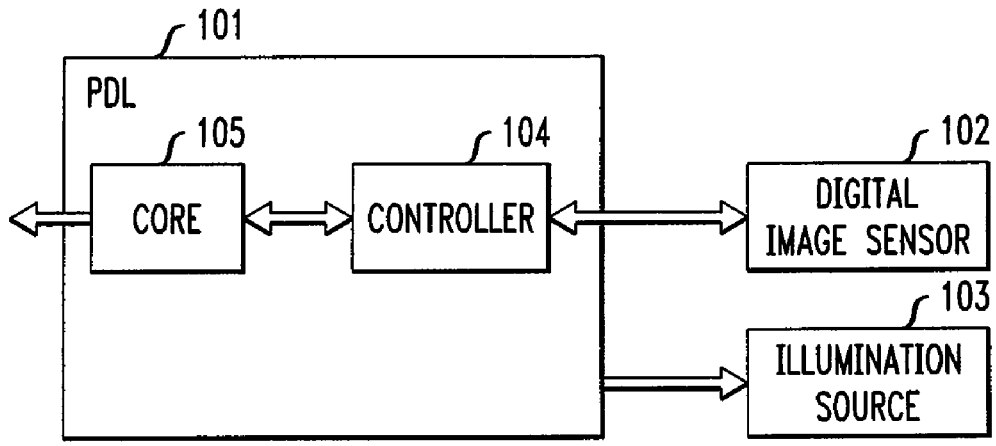
FIG. 3A is a simplified block diagram of an LSoC in accordance with a representative embodiment.

FIG. 3A is a simplified block diagram of an LSoC 300 in accordance with a representative embodiment. The components of the LSoC 300 are substantially identical to those of the location system 100 described in connection with FIG. 1. The description of these components and their function are not repeated in the interest of brevity.

As described previously, there is a need to provide a location system of a comparatively small physical size. The LSoC 300 can be provided in integrated form using one of a variety of technologies. For example, the individual components may be provided as individually packaged devices, which are often semiconductor devices. These individually packaged devices are comparatively small and may be provided on a suitable substrate. An LSoC comprising a fully integrated circuit including the noted components is also contemplated. To this end, the LSoC 300 may be a complete system on a chip with all components integrated therein by known methods. As will be appreciated, compared to many known systems, the LSoC 300 may be realized in a substantially reduced size. Beneficially, this facilitates the inclusion of a location system into many environments.

Figure 3B:
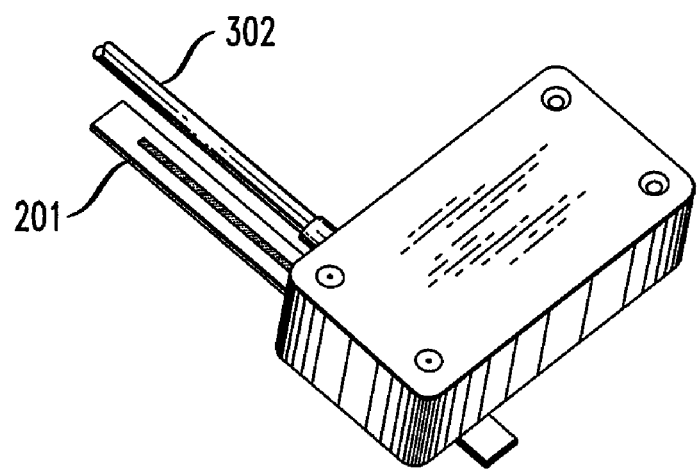
FIG. 3B is a perspective view of a packaged LSoC in accordance with a representative embodiment.

FIG. 3B is a perspective view of a packaged LSoC (package) 301 disposed over object 201 in accordance with a representative embodiment. The package 301 includes an LSoC such as described in connection with FIG. 3A. The package 301 may be fabricated from one or more of a variety of materials suitable for the particular measurement application or environment. Because the packaged LSoC 301 is contemplated for use in a wide variety of measurement applications, the scope of the materials is also widely varying. For purely illustrative purposes, the package may be made of a known plastic material.

The package 301 connects to a cable 302, which provides connections to and from the LSoC, including signal and power connections. In a representative embodiment, the packaged LSoC 301 is substantially sealed and therefore not greatly susceptible to contamination from ambient elements. Beneficially, this allows for the implementation of the LSoC in many environments (e.g., manufacturing) where ambient contaminants are prevalent and can compromise the functionality of location systems.

In addition to providing a comparatively small and well protected location system, the LSoC 300 and the packaged LSoC 301 are also less susceptible to error due to thermal expansion than larger systems. As noted previously, the comparatively large known location systems may incur measurement error that is greater than the dimensions of measure. By contrast, the comparatively small size of the systems of the representative embodiments fosters comparatively small measurement error from thermal expansion.

The comparatively small size of the packaged LSoC 301 fosters its adaptability to a comparatively wide variety of measurement applications. For instance, in certain embodiments, the LSoC package 301 may be provided within or be essentially surrounded by a comparatively small stage allowing the measurement data to be garnered. Using known location systems, such measurement gathering would not be practical or possible as known encoders are too large to allow movement of the stage. Beneficially, the comparatively small physical size of the package 301 allows for location data to be gathered from comparatively small stages.

Another useful aspect of the LSoC package 301 is its ready use in existing systems. In particular, the comparatively small size of the package 301 allows for its retrofitting into existing systems and its replacing of a cumbersome encoder.

Figure 4:
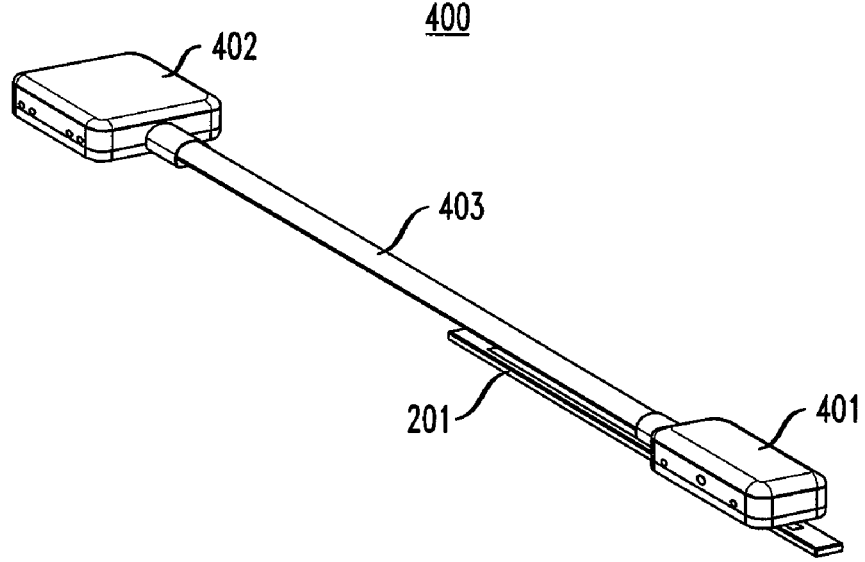
FIG. 4 is a perspective view of a location system in accordance with a representative embodiment.

FIG. 4 is a perspective view of a location system 400 in accordance with a representative embodiment. The system 400 includes many of the components and features of previously described embodiments. Many of the details of these components and features are not repeated to avoid obscuring the description of the presently described embodiments.

The system 400 includes a first part 401 and a second part 402, and a connection (e.g., a cable or bus) 403 between the first and second parts 401, 402. In one embodiment, the first part 401 includes the digital image sensor 102 and the illumination source 103; and the second part 402 includes the PLD 101, which is illustratively an FPGA. In illustrative embodiments, the first and second parts 401, 402 are packages including the noted components. The packages are illustratively similar to those described in conjunction with the packaged LSoC 301.

As noted previously, it is often beneficial to mitigate thermal expansion in the location system to the extent feasible. In the present embodiment, the components needed for illuminating and capturing the target are provided in the first part 401; and the components needed for calculating the absolute position and controlling the various components of the system 400 are provided in the second part 402. Thereby, the electronic components, which are the main sources of heat generation, are separated to mitigate the impact of thermal expansion on measurement precision.

In another embodiment, the first part 401 includes the digital image sensor 102, the illumination source 103 and a first PLD. The second part 402 includes a second PLD. The first PLD is adapted to perform certain calculations of the method described in the parent application and the referenced U.S. patent. Illustratively, the first PLD may include software modules to perform certain data accumulations, such as the summations of rows and columns of pixels from captured images. The second PLD may then generate respective image vectors representing the summations of rows and columns of pixel values from the image; and determine the absolute position of the subset of the target pattern relative to the origin. In addition, the second PLD may also include the control functionality described in connection with the PLD 101 in other embodiments.

It is noted that the PLDs of the presently described embodiment may be one or more of a variety of PLDs, such as described previously. Illustratively, the PLDs may be FPGAs instantiated with software modules (cores) to perform functions of the location system 400. Moreover, the described division of functionality of the PLDs is intended merely to be illustrative. It is emphasized that one skilled in the art will readily appreciate other divisions of functionality between the PLDs, as well as the use of more than two PLDs in the system.

Figure 5:
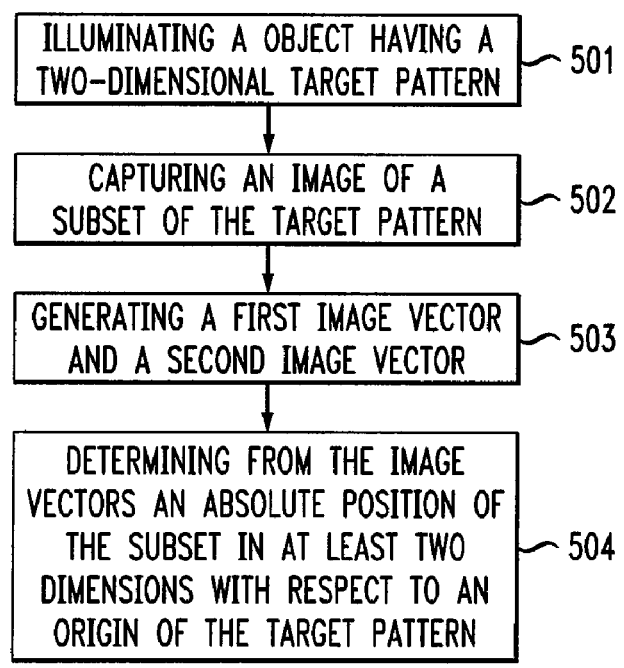
FIG. 5 is a flow-chart of a method of determining a location in accordance with a representative embodiment.

FIG. 5 is a flow-chart of a method 500 of determining a location in accordance with a representative embodiment. The method 500 may be implemented in the various location systems described previously.

At step 501, an object having a two-dimensional target pattern is illuminated. This illumination is done by the illumination source 103, described above. It emphasized that the method may be expanded to determined absolute locations of a subset of a target pattern in more than two dimensions. Details of determining a location in more than two dimensions are not described in order to avoid obscuring the description of the present embodiments.

At step 502, an image of a subset of the target pattern is captured, such as by the digital image sensor 103. As described previously, the synchronization of the illumination and image capture is controlled by the PLD 101.

At step 503, after the image data 108 are provided from the digital image sensor 103 to the PLD 101, a first image vector and a second image are generated. The generation of the image vectors is carried out in respective cores 105 of the PLD 101, for example. Alternatively, in embodiments such as described in connection with FIG. 4, the generation of image vectors may be carried out in the first PLD, or the second PLD, or a combination thereof. Specific details of the method of generating the image vectors are described in connection with representative embodiments above and are provided and in the parent application and referenced patent.

At step 504, after the image vectors are generated, an absolute position of a location of the subset of a target pattern is determined relative to an origin of the target pattern. Again, the determination of the location is carried out in respective cores of the PLD(s) of the representative embodiments and by methods described in the parent application and referenced patent. These data are provided to the user as location data 109.

In view of this disclosure it is noted that the various methods and devices described herein can be implemented in hardware and software. Further, the various methods and parameters are included by way of example only and not in any limiting sense. In view of this disclosure, those skilled in the art can implement the present teachings in determining their own techniques and needed equipment to implement these techniques, while remaining within the scope of the appended claims.

The invention claimed is:

1. A location system, comprising:
    an image sensor adapted to capture an image of a subset of a target pattern; and
    a programmable logic device (PLD) operative to generate a first image vector representing summations of rows of pixel values from the image, and a second image vector representing summations of columns of pixel values from the image, wherein the PLD is configured to determine from the image vectors an absolute position of the subset in at least two dimensions with respect to an origin of the target pattern.

2. A location system as claimed in claim 1, further comprising:
    a controller connected to the PLD and adapted to input operating parameters of the PLD.

3. A location system as claimed in claim 1, further comprising:
    a controller connected to the PLD and adapted to receive data from the PLD and, based on the data, to determine a status of an operating parameter of the system.

4. A location system as claimed in claim 1, wherein the PLD comprises a field programmable gate array (FPGA).

5. A location system as claimed in claim 4, wherein the FPGA further comprises at least two cores, wherein each of the cores are operative to determine the absolute position for a respective one of the dimensions.

6. A location system as claimed in claim 4, further comprising a controller embedded in the FPGA and adapted to perform operations comprising: inputting operating parameters to the FPGA, or receiving data from the FPGA and, based on the data to determine a status of an operating parameter of the system, or both.

7. A location system as claimed in claim 1, further comprising another PLD, which is adapted to provide data to the PLD.

8. A location system as claimed in claim 5, wherein each of the cores is a software core instantiated in the FPGA.

9. A location system as claimed in claim 6, wherein the controller is embodied in software.

10. A location system as claimed in claim 5, wherein the cores determine absolute positions in respective dimensions concurrently.

11. A location system as claimed in claim 1, wherein the system further comprises:
   a first part, which includes the image sensor, an illumination source and the PLD; and
   a second part, which includes another PLD.

12. A location as claimed in claim 1, wherein the system further comprises:
   a first part, which includes the image sensor and an illumination source; and
   a second part, which includes the PLD.

13. A location system on a chip (LSoC), comprising:
   an image sensor adapted to capture an image of a subset of a target pattern; and
   a programmable logic device (PLD) operative to generate a first image vector representing summations of rows of pixel values from the image, and a second image vector representing summations of columns of pixel values from the image, wherein the PLD is configured to determine an absolute position of the subset with respect to an origin of the target pattern in at least two dimensions.

14. An LSoC as claimed in claim 13, further comprising:
   a controller connected to the PLD and adapted to input operating parameters to the PLD.

15. An LSoC as claimed in claim 13, further comprising:
   a controller connected to the PLD and adapted to receive data from the PLD and, based on the data to determine a status of an operating parameter of the system.

16. An LSoC as claimed in claim 14, wherein the PLD is a field programmable gate array (FPGA).

17. An LSoC as claimed in claim 16, wherein the FPGA further comprises at least two cores, wherein each of the cores are operative to determine the absolute position for a respective one of the dimensions.

18. An LSoC as claimed in claim 16, further comprising a controller embedded in the FPGA and adapted to: input operating parameters to the FPGA, or to receive data from the PLD and based on the data to determine a status of an operating parameter of the system, or both.

19. An LSoC as claimed in claim 13, wherein the LSoC further comprises another PLD, which is adapted to provide data to the PLD.

20. An LSoC as claimed in claim 17, wherein each of the cores is a software core instantiated in the FPGA.

21. An LSoC as claimed in claim 20, wherein the controller is embodied in software.

22. An LSoC as claimed in claim 17, wherein the cores determine respective absolute positions concurrently.

23. A method of determining a location, the method comprising:
   illuminating an object having a target pattern;
   capturing an image of a subset of the target pattern; and
   in a field programmable gate array (FPGA): generating a first image vector representing summations of rows of pixel values from the image and a second image vector representing summations of columns of pixel values from the image; and
   determining an absolute position of the subset with respect to an origin of the target pattern in at least two dimensions.

24. A method as claimed in claim 23, wherein the determining is done in the at least two dimensions concurrently.

* * * * *